United States Patent [19]

Lincoln

[11] 4,261,098

[45] Apr. 14, 1981

[54] APPARATUS FOR CLIPPING SHEETS TOGETHER

[76] Inventor: Walter B. Lincoln, 357 Bay Shore Dr., Barnegat, N.J. 08005

[21] Appl. No.: 43,322

[22] Filed: May 29, 1979

Related U.S. Application Data

[62] Division of Ser. No. 926,661, Jul. 21, 1978, abandoned.

[51] Int. Cl.$^3$ .............................................. B23Q 7/10

[52] U.S. Cl. .................................. 29/809; 29/243.56; 29/814

[58] Field of Search ..................... 29/243.56, 809, 814; 53/138 A; 93/1 E; 227/77, 83

[56] References Cited

U.S. PATENT DOCUMENTS

| | | | |
|---|---|---|---|
| 2,158,168 | 5/1939 | Woodruff | 29/814 X |
| 2,222,220 | 11/1940 | Binch | 29/243.56 X |
| 3,150,790 | 9/1964 | Beneteau | 29/814 X |
| 3,543,376 | 12/1970 | Lovell et al. | 29/814 X |
| 3,611,782 | 10/1971 | Eppler | 29/243.56 X |
| 3,829,954 | 8/1974 | Takamizawa et al. | 29/814 |

*Primary Examiner*—Ervin M. Combs
*Attorney, Agent, or Firm*—George J. Harding, III

[57] ABSTRACT

A spring wire clip for clipping together sheets has a head and a pair of legs extending forwardly and outwardly from the head. Each leg has a forward transverse portion and a return portion at the end of the transverse portion which lies substantially outside the width of the head. Apparatus for clipping a plurality of sheets with a spreadable spring clip having a head and a pair of legs has an upstanding magazine for the spring clips, a support for the sheets which are to be clipped together and a pusher for engaging the head of the lowermost clip in the magazine and advancing the clip to the sheet support. Cams interposed between the sheet support and the magazine are engaged by the clip as it is advanced for spreading the legs of the clip and then releasing them when they are overlying the sheet support.

3 Claims, 12 Drawing Figures

APPARATUS FOR CLIPPING SHEETS TOGETHER

This is a division of application Ser. No. 926,661, filed July 21, 1978, abandoned.

BACKGROUND OF THE INVENTION

While it is well known to employ paper clips to hold sheets of paper together, a clip which can be machine opened and fed to a plurality of sheets of paper to clip them together and a machine to carry such an operation are not known.

BRIEF SUMMARY OF THE INVENTION

A spring wire clip for clipping together sheets has a head and a pair of legs extending forwardly and outwardly from the head. Each leg has a forward transverse portion and a return portion at the end of the transverse portion which lies substantially outside the width of the head. Apparatus for clipping a plurality of sheets with a spreadable spring clip having a head and a pair of legs has an upstanding magazine for the spring clips, a support for the sheets which are to be clipped together and a pusher for engaging the head of the lowermost clip in the magazine and advancing the clip to the sheet support. Cams interposed between the sheet support and the magazine are engaged by the clip as it is advanced for spreading the legs of the clip and then releasing them when they are overlying the sheet support.

DETAILED DESCRIPTION OF THE PREFERRED EMBODIMENT

Figure 4:
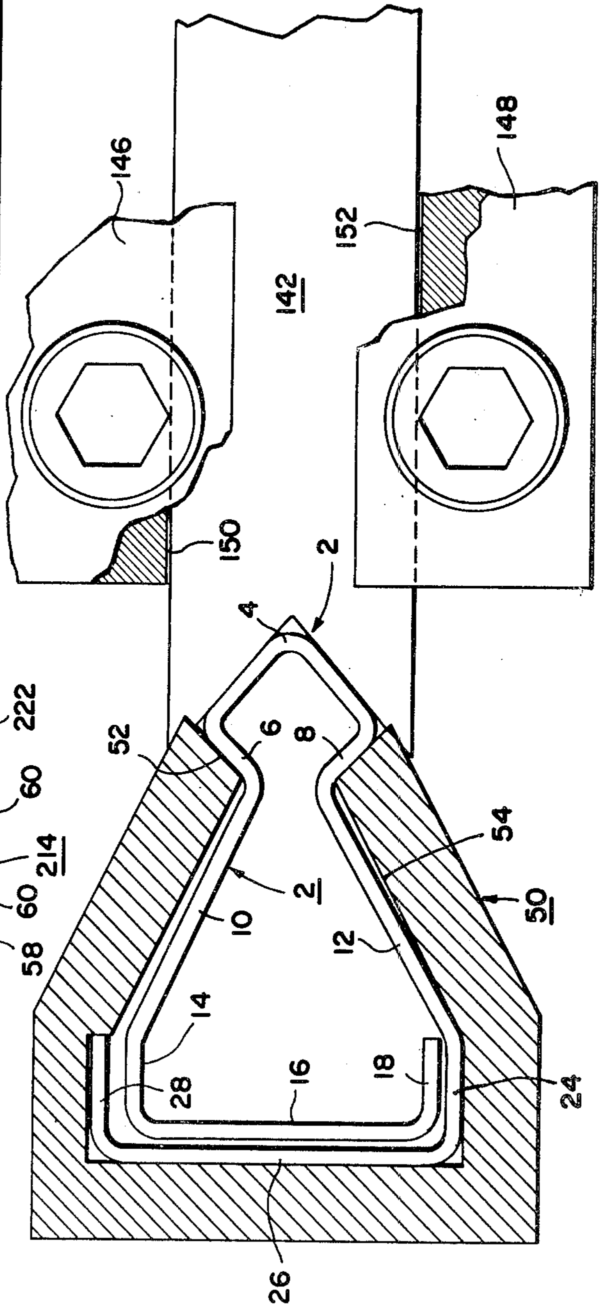
FIG. 4 is an enlarged view of a clip.

Referring first to FIG. 4, a spring wire clip 2 in accordance with the invention which may be formed for example of spring steel wire, has a triangular head 4 with a pair of forwardly and inwardly extending legs 6 and 8 which are integral with forwardly and outwardly extending legs 10 and 12, respectively. Leg 10 has a forward portion 14 which extends directly forwardly, a transverse portion 16 and a return portion 18. Similarly, leg 12 has a forward portion 24 which extends directly forwardly, a transverse portion 26 and a return portion 28. All portions of clip 2 lie substantially in the same plane and portions 14, 16 and 18 lie closely adjacent to portions 28, 26 and 24, respectively.

Figures 1, 2:
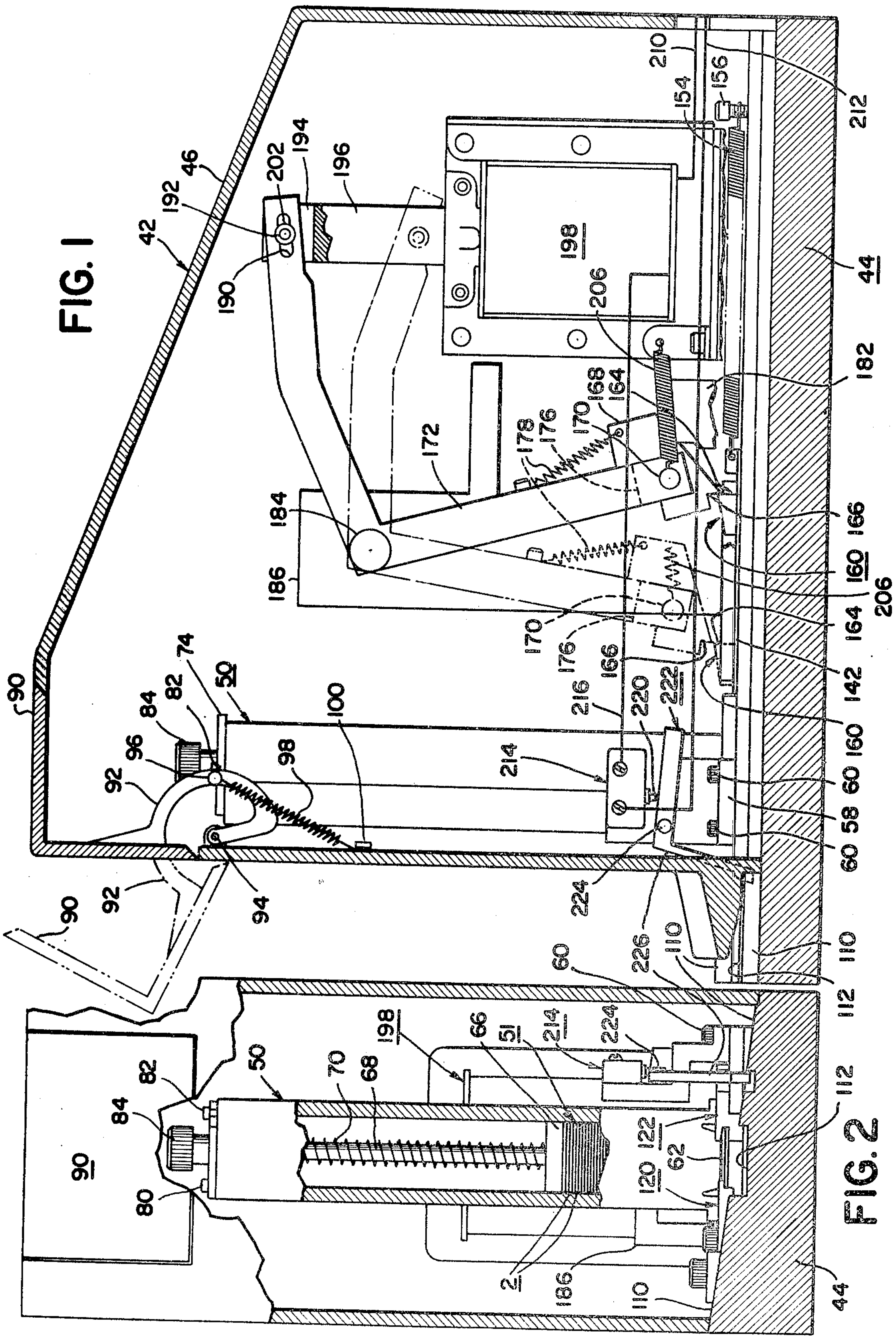
FIG. 1 is a side elevation of clipping apparatus in accordance with the invention with the housing broken away.
FIG. 2 is a front elevation of the apparatus of FIG. 1 with the housing partially broken away.
Figure 3:
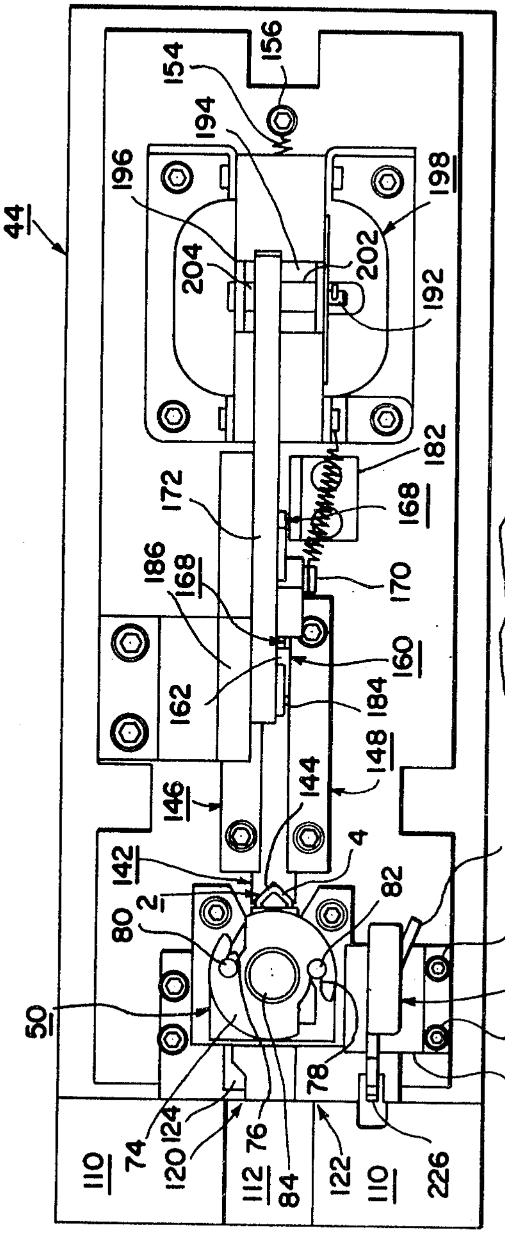
FIG. 3 is a top plan view of the apparatus of FIG. 1 with the housing removed.

Referring now to FIG. 1, apparatus 42 useful for clipping together sheets has a base 44 and a removable cover 46 secured to the base by machine screws (not shown). As seen in FIG. 2, a magazine 50 contains a stack 51 of clips 2 which advantageously are secured together by an adhesive 5 in a manner similar to staples for ease of handling. As best seen in FIG. 4, magazine 50 has an opening 52 which accommodates legs 6 and 8 of head 4 and a cavity 54 which is shaped to accommodate the portions of clip 2 forward of legs 6 and 8. The base 58 of magazine 50 is secured to base 44 by screws 60 and is cut away as indicated at 62 (FIG. 9A) to permit the lowermost clip 2 in magazine 50 to be advanced forwardly out of the magazine. A plunger 66 (FIG. 2) lies on top of stack 51 and is slidably mounted on rod 68 which has a recessed stop 72 in a recess 71 at its lower end to limit the downward travel of plunger 66 which is biased downwardly by a compression coil spring 70 which has its lower end abutting plunger 66 and its upper end abutting plate 74 which has opposed notches 76 and 78 (FIG. 3) which are adapted to removably engage headed pins 80 and 82, respectively, on rotation of plate 74 clockwise as viewed in FIG. 3 with the slots being narrower than the heads of the pins to retain plate 74 against upward movement. An operating knob 84 is secured to the top of plate 74 to facilitate rotating it into the engaged and disengaged positions.

Housing 46 has a door 90 (FIG. 1) which opens outwardly to permit access to magazine 50 for supplying the magazine with clips. Door 90 is secured to a pair of angled arms 92 (only one of which is shown) each of which is pivotally mounted on a pin 94 secured to housing 46 and carries a boss 96 to which is secured an extension coil spring 98 which is also secured at 100 to housing 46 to bias the door 90 to the closed position when the door is moved from the open position towards the closed position sufficiently to move boss 96 to the right of pin 94 as viewed in FIG. 1.

At the left-hand end of the apparatus 42 as viewed in FIG. 1, the base 44 is formed into a sloping support 110 for sheets to be clipped together. Support 110 has a recessed portion 112 for the passage of a clip.

Figure 7:
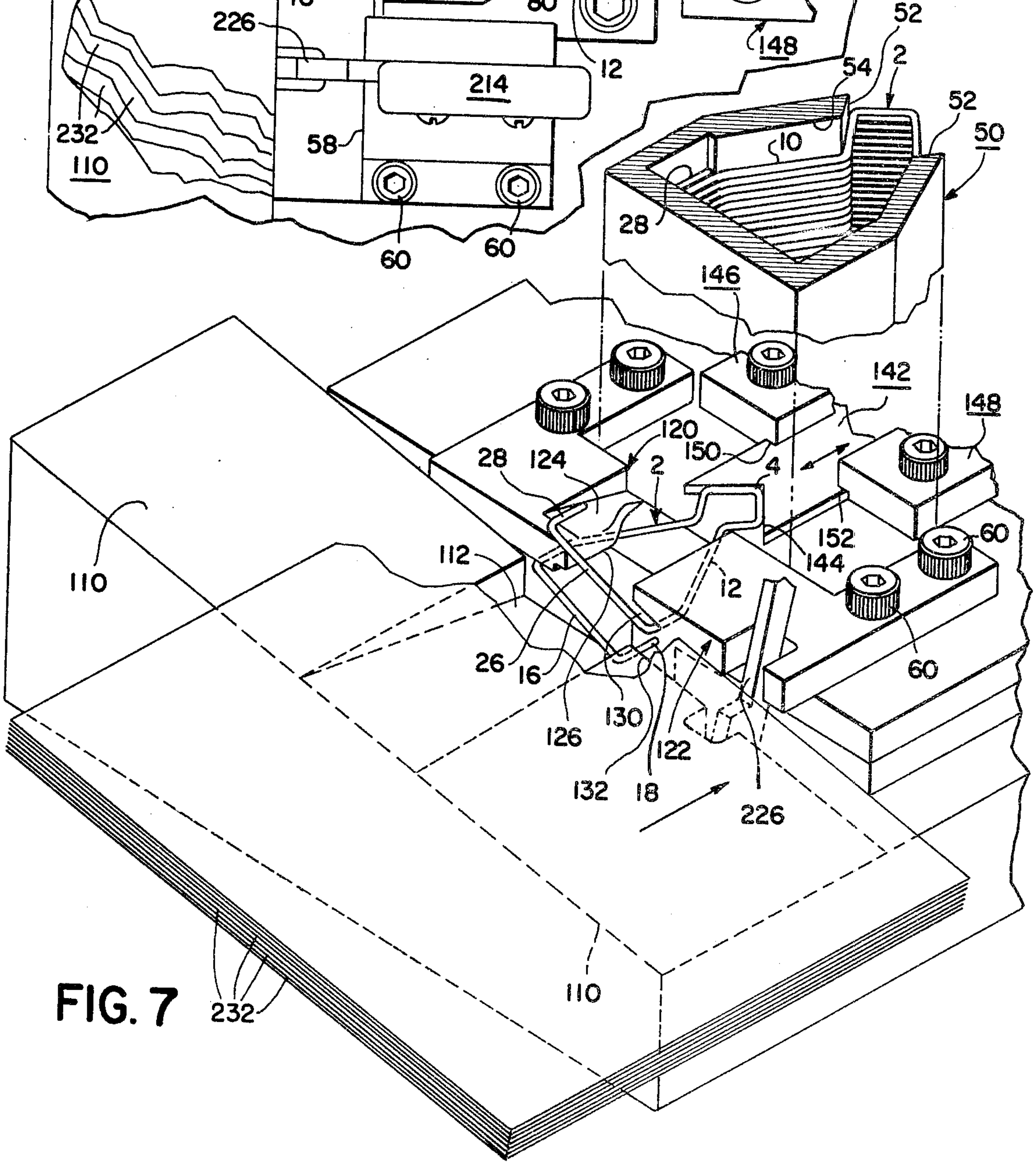
FIG. 7 is a front perspective view of the portion of the apparatus shown in FIG. 6.
Figure 9:
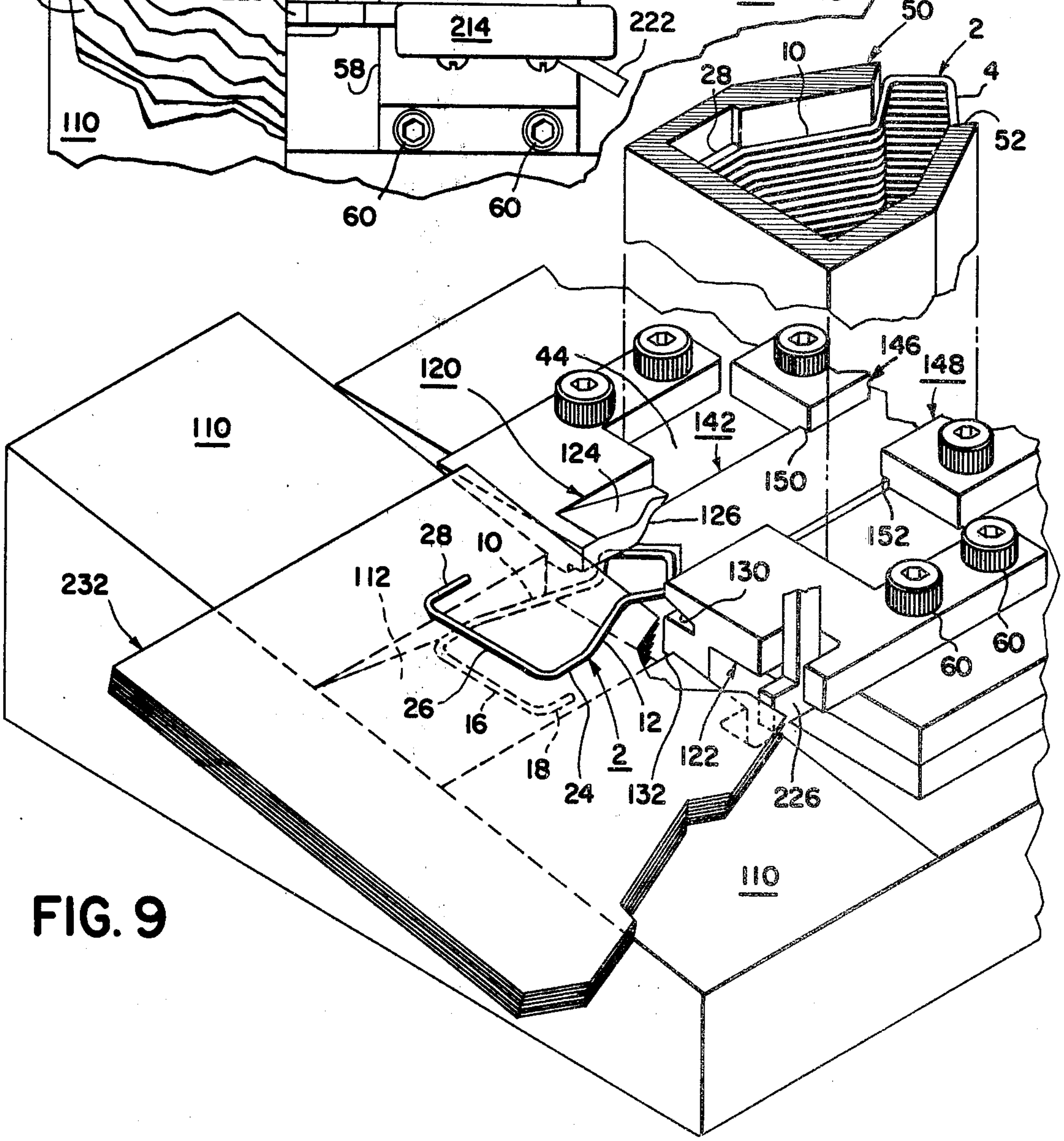
FIG. 9 is a right side perspective view of the portion of the apparatus of FIG. 1 shown in FIG. 8.
Figure 9A:
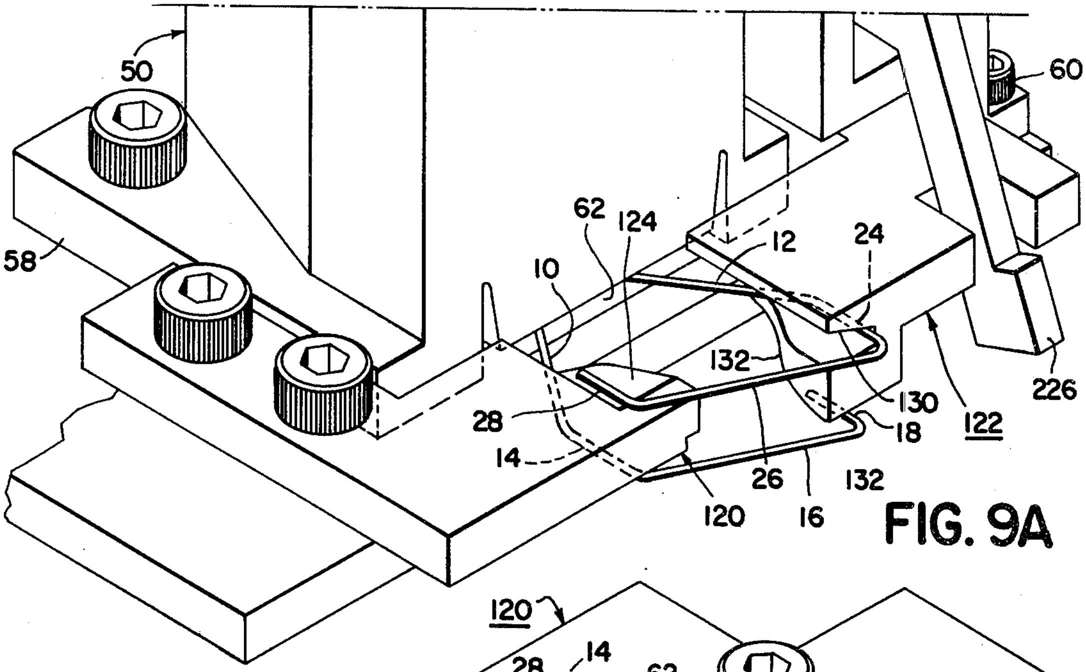
FIG. 9A is a left side perspective view of the portion of the apparatus shown in FIG. 8 partially broken away.
Figure 9B:
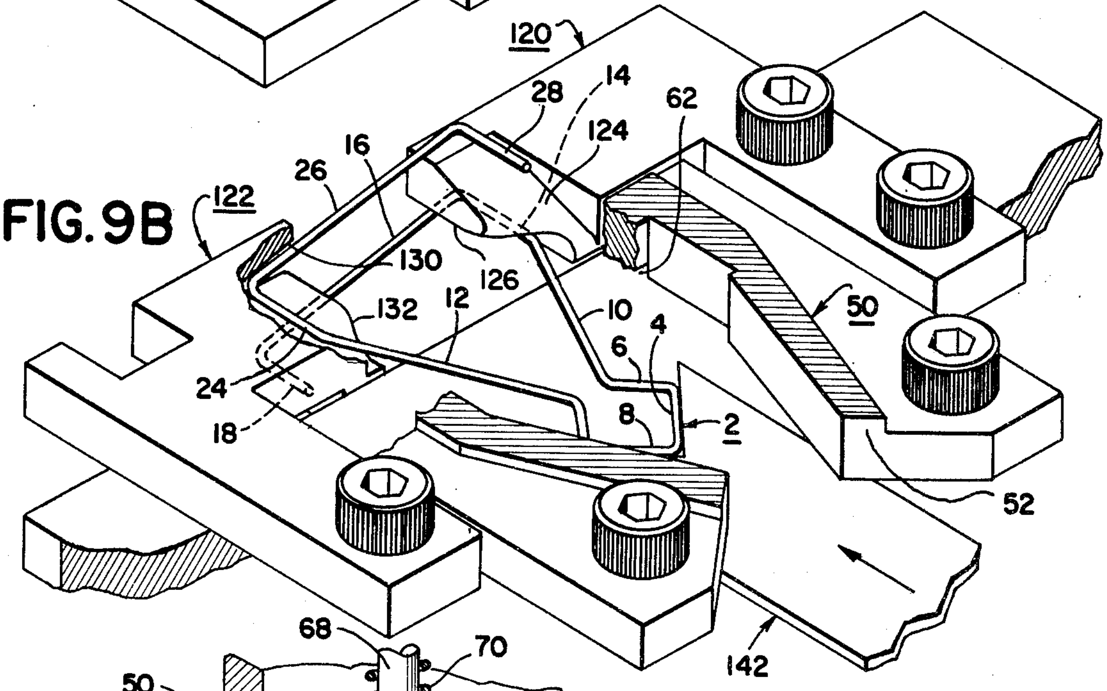
FIG. 9B is a left rear perspective view of the portion of the apparatus shown in FIG. 8 partially broken away.
Figure 10:
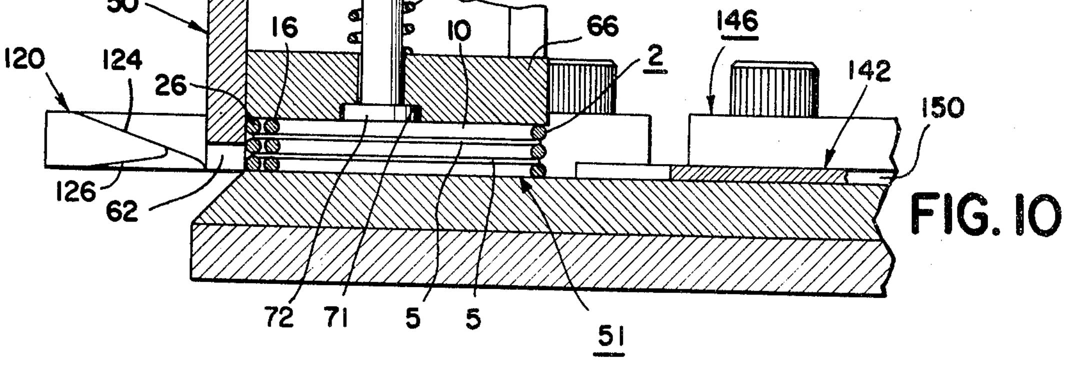
FIG. 10 is a view of the magazine broken away to show the plunger.

Between magazine 50 and support 110 lie a pair of spaced cams 120 and 122 (FIG. 7) which function to open a clip prior to the presentation of the clip to sheets on the support 110 (FIG. 9). Cam 120 has a ramp 124 on its upper surface which extends upwardly from the upper surface of base 44 on which a clip 2 rests in magazine 50 and is adapted to engage clip transverse portion 26 and clip return portion 28 to cam them upwardly away from clip portions 14, 16 and 18. Cam 120 also has an inwardly protruding lower surface 126 (FIG. 9B) which acts to hold down leg 10 during the clip spreading operation. Cam 122 has a groove 130 (FIGS. 9 and 9B) which is opposite the top of base 44 which receives transverse member 26 and the forward portion 24 of leg 12 and a lower cam surface 132 (FIGS. 9A and 9B) which is engaged by clip transverse portion 16 and return portion 18 to cam them downwardly from leg 12.

Figure 5:
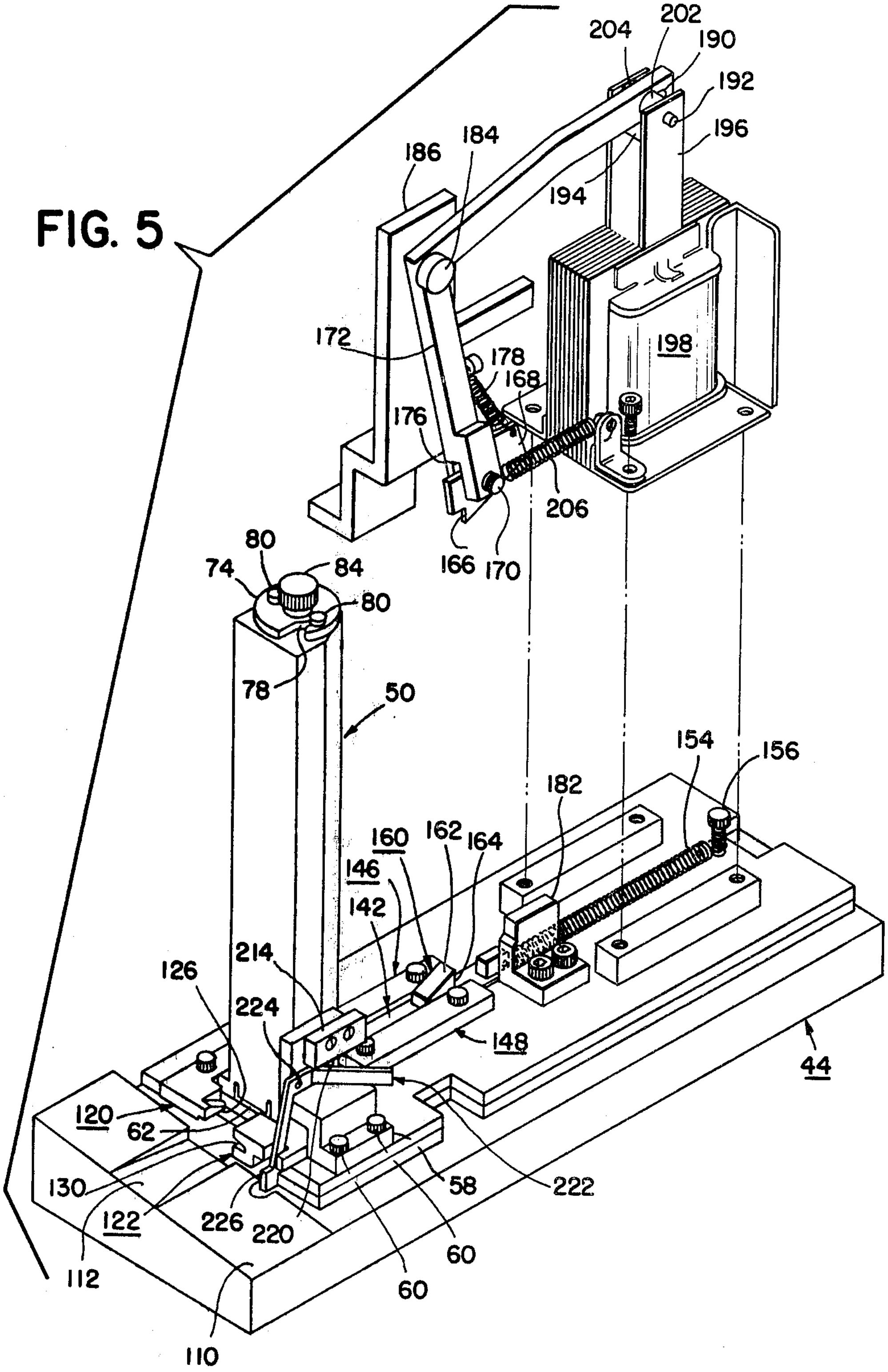
FIG. 5 is an exploded perspective view of parts of the apparatus of FIG. 1.
Figure 6:
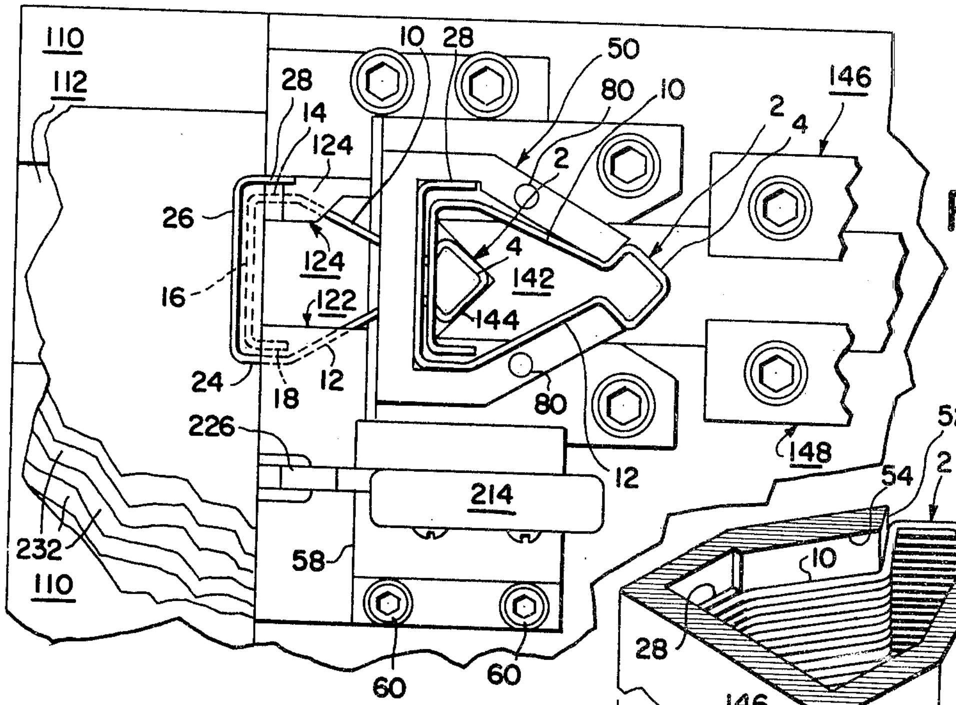
FIG. 6 is a horizontal section of the apparatus of FIG. 1 partially broken away showing the clip magazine and the cams.

A pusher 142 (FIG. 3) has a notched end 144 for engaging the head 4 of a clip 2 is guided by guide bars 146 and 148 which respectively have undercut portions 150 and 152 (FIG. 9) for reception of pusher 142 which rests on the upper surface of base 44. The rear end of pusher 142 is secured to an extension coil spring 154 (FIG. 1) which has its other end secured to a screw 156 secured to base 44. Pusher 142 carries an upstanding boss 160 (FIG. 5) which has an upper cam surface 162 and a rear wall 164 engaged by face 166 of a lever 168 which is pivoted at 170 to a bell crank 172. Lever 168 is received in a slot 176 in bell 172 with the right-hand portion of the lever as viewed in FIG. 1 extending above the upper end of slot 176 to act as a stop against counterclockwise pivoting as viewed in FIG. 1 when it engages crank 172. An extension coil spring 178 is connected to lever 168 and crank 172 to bias lever 168 counterclockwise as viewed in FIG. 1. A stop 182 (FIG. 5) mounted on base 44 limits the rearward travel of pusher 142 under the urging of spring 154.

Crank 172 is pivoted at 184 to a standard 186 mounted on base 44 and has a slot 190 engaged by pin 192 carried by yoke 194 of plunger 196 of a solenoid 198. Bushings 202 and 204 (FIG. 3) keep crank 172 in the desired position with respect to the axis of pin 192. Crank 172 is biased closkwise by an extension coil spring 206 as viewed in FIG. 1.

Solenoid 198 is supplied with power by lines 210 and 212 (FIG. 1), line 210 being connected to one end of the solenoid coil and line 212 being connected to one side of a microswitch 214, the other side of which is connected by line 216 to the other end of the solenoid coil. Microswitch 214 has an operating plunger 220 which is adapted to be engaged by a bell crank 222 pivoted as shown at 224. Arm 226 of crank 222 extends downwardly adjacent support 110 and is adapted to be cammed by sheets resting on the support 110 to rotate it in a counterclockwise direction as shown in FIG. 1 to close microswitch 214 and actuate solenoid 198.

Operation

Figure 8:
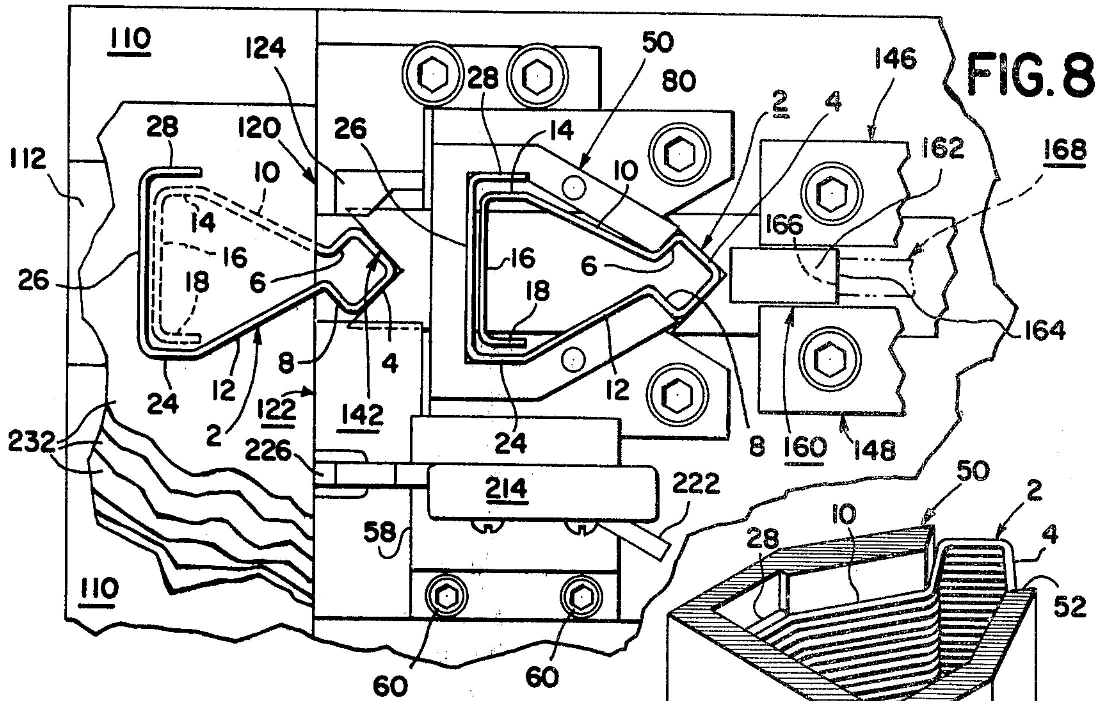
FIG. 8 is a horizontal sectional view partially broken away of the apparatus of FIG. 1 showing a clip engaging a plurality of sheets of paper.

With clips in magazine 50, a plurality of sheets 232 of, for example, paper are placed on support 110 and moved against arm 226 of crank 222 which acts to close switch 214 engaging solenoid 198. Plunger 196 is pulled downwardly causing lever 172 to move clockwise (FIG. 1) and cause lever 168 to advance pusher 142 against a clip 2. As the clip is advanced transverse portion 26 and return portion 28 are cammed upwardly by cam surface 124 (FIG. 9B) and leg 10 is held down by cam surface 126. Leg 12 slides along base 44 and directly into slot 130 and cam surface 132 cams transverse portion 16 and return portion 18 downwardly. With the clip thus opened it is urged on either side of the sheets 232 as seen in FIGS. 8 and 9. As the clip is still further advanced it is released from cams 110 and 122 and starts to come together.

The clip continues its advance and then clamps the sheets 232 just after its advance stops due to lever 168 moving upwardly sufficiently to clear boss 160 permitting spring 154 to return pusher 142 against stop 182. The clipped sheets are removed causing switch 214 to open and solenoid 198 to be deenergized causing plunger 19 to move and lever 172 to rotate counterclockwise, as viewed in FIG. 1. Lever 168 engages cam surface 162 on boss 160 and rotates clockwise (FIG. 1) until it clears boss 160 when its rotation is reversed by spring 178 and it falls behind boss 160 ready for another clipping operation.

It will be understood that the above-described embodiments are illustrative and are not intended to be limiting.

I claim:

1. Apparatus for clipping a plurality of sheets together with a spreadable spring clip having a head at its rear end and first and second spaced legs extending forwardly, each leg having a forward transverse portion and a rearwardly extending return portion at the end of the transverse portion with one return portion being outside said first leg and the other return portion being inside the said second leg, and all of the clip lying in a single plane, comprising:

- an upstanding magazine for clips,
- a support for sheets,
- first cam means between the magazine and said support having a portion adapted to lie outside said first leg for engaging said one return portion and raising it from the at rest plane of the clip to a position above said plane,
- second cam means between the magazine and said support camming apart the other return portion and the second leg,
- a pusher adapted to engage the head of the lowermost clip in the magazine and,
- means to advance the pusher to advance a clip past the first and second cam means to the support for sheets.

2. Apparatus in accordance with claim 1 in which said pusher is biased towards the retracted position by a spring and the advancing means releases the pusher after its advance for a return to its retracted position.

3. Apparatus in accordance with claim 2 in which the means to advance the pusher includes a pivotally mounted lever,

- a solenoid connected to the lever to pivot it,
- a second lever pivoted to the lower end of the first lever engaging the pusher and clearing it when the pusher is fully advanced,
- a spring biasing the pivoted lever towards said pusher,
- said pusher having a cam surface over which the pivoted lever moves on the return of the solenoid to the retracted position, and
- a switch controlling the solenoid adapted to be engaged by sheets on the support to actuate the solenoid.

* * * * *